J. H. McLAUGHLIN.
ATTACHMENT FOR SLICING MACHINES.
APPLICATION FILED SEPT. 15, 1919.
1,339,901.
Patented May 11, 1920.
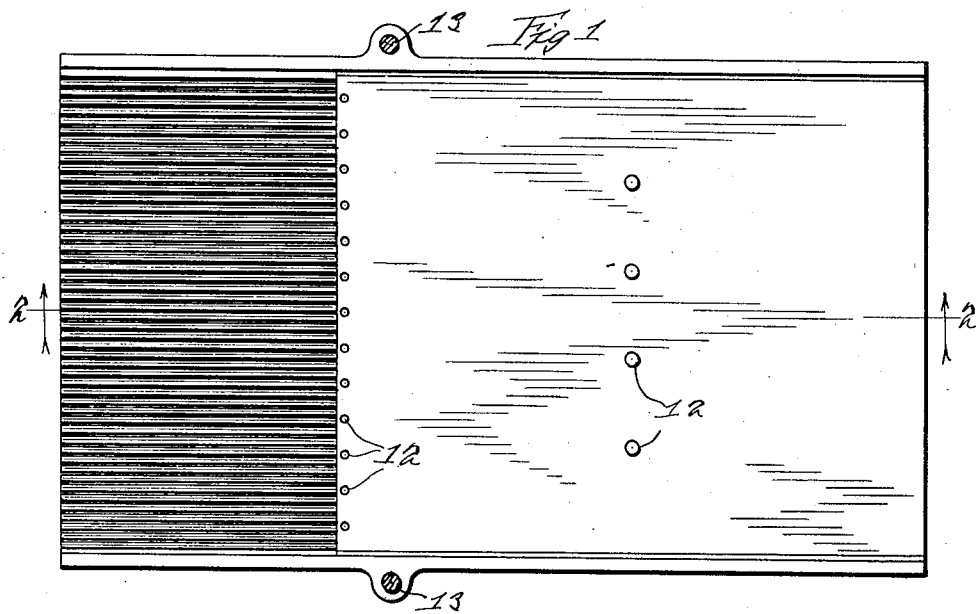
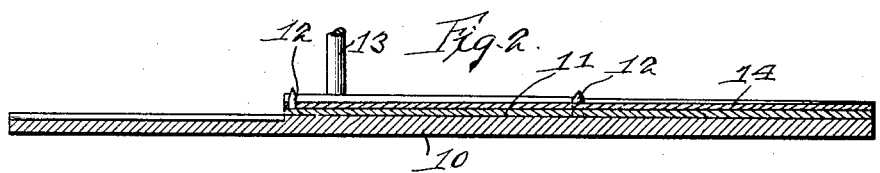
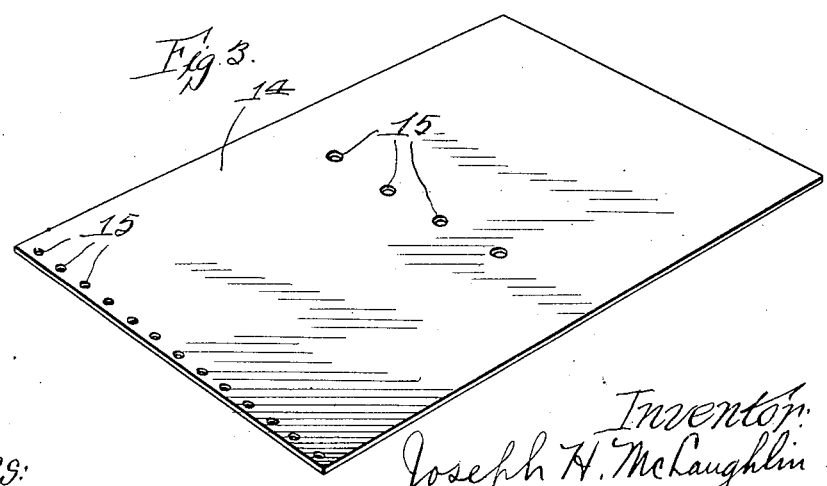
Witness:
David S. Magnusson.
Inventor:
Joseph H. McLaughlin
By Brown & Nissen
Attys

UNITED STATES PATENT OFFICE.

JOSEPH H. McLAUGHLIN, OF CHICAGO, ILLINOIS.

ATTACHMENT FOR SLICING-MACHINES.

1,339,901.  Specification of Letters Patent.  Patented May 11, 1920.

Application filed September 15, 1919. Serial No. 323,943.

*To all whom it may concern:*

Be it known that I, JOSEPH H. McLAUGHLIN, a citizen of the United States, residing in Chicago, in the county of Cook and State of Illinois, have invented a certain new and useful Attachment for Slicing-Machines, of which the following is a specification.

This invention has for its object the provision of a slicing machine attachment which shall render machines for slicing meat and other material more sanitary, convenient and efficient in operation.

The invention is exemplified in the combination and arrangement of parts shown in the accompanying drawing and described in the following specification, and it is more particularly pointed out in the appended claims.

In the drawing—

Figure 1 is a top plan view of a portion of a slicing machine having one embodiment of the present invention applied thereto.

Fig. 2 is a section on line 2—2 of Fig. 1.

Fig. 3 is a perspective of one form of the attachment comprised in the present invention.

Slicing machines of various standard makes are commonly provided with a reciprocating carriage which presents the meat or other material to be sliced to a rotary slicing knife and the reciprocating carriage supports a platform or a meat plate which is fed in a direction transverse to the direction of movement of the carriage for the purpose of feeding the meat forwardly after each slice is cut so that it will project into the plane of the knife preparatory for the next slice. The sliding platform or meat plate is usually provided with a meat clamp and a plurality of upwardly projecting pointed pins which assist in holding the meat in place on the platform. It has been found in practice that this meat plate is very difficult to keep in a sanitary condition. The upwardly projecting pins make it hard to wipe clean and the juices from the meat will attack the metal of which the plates are usually made causing oxidization or verdigris and rendering the plate unsightly and unsanitary.

In the drawing, the numeral 10 represents a conventional material-supporting table of a slicing machine of any of the various makes, and the numeral 11 designates the work-supporting platform or meat plate. A plurality of pins 12 are shown as extending upwardly from the platform for holding the meat in place thereon and rods 13 extend upwardly for the purpose of supporting a meat clamp. In Fig. 3 is shown a plate 14 which is preferably made of relatively thin sheet metal of a composition which will resist the action of the meat juices and other materials to which the supporting surface of the platform is subjected. The best material now known to me for this purpose is what is known in the trade as Monel metal but other materials having the requisite properties may, of course, be substituted. The plate 14 is provided with a plurality of openings 15 arranged to conform in size and spacing to the pins 12 on the supporting platform 11. It will be seen that the plate 14 may be placed upon the upper surface of the platform 11 so that the pins 12 will project through the openings 15 into position to engage the material placed upon the platform. When the plate 14 is thus in place the pins 12 will prevent any lateral movement of the plate so that it is held securely in position. The weight of the material on the platform and also the pressure of the holding clamp will hold the plate down upon the platform 11 when material is secured to the platform. It will be seen that the plate 14 in no way interferes with the regular operation of the slicing machine and that it protects the portions of the machine which come into contact with the material operated upon from the action of any substances in the composition of the material. It is also seen that the plate is easily removed and cleaned and that when it has been removed, it may be easily wiped or cleaned in any manner without interference from the pins 12 which remain secured to the platform 11. Thus it is made possible to provide a platform having upwardly projecting pins for engaging the material to be held thereon and yet the inconvenience of cleaning a pin-studded platform is avoided for the reason that the plate may be removed, thus freeing it from the pins when it is desired to clean the plate.

While I have shown and described my invention as applied to a well known type of slicing machine, it will be understood that I do not confine myself to the application of the invention to any particular form of machine.

I claim:

1. A supporting platform having projections thereon for engaging material, and a removable cover plate for said platform having the material-engaging portion thereof free from projections, to permit easy cleaning of said plate when removed from said platform.

2. A supporting platform having projections thereon for engaging material, and a removable cover plate for said platform having openings therethrough for receiving said projections, said projections extending through said plate to engage material thereon when said plate is in place on said platform.

3. A supporting platform having upwardly projecting material engaging pins on the upper face thereof, and a removable cover plate having openings therethrough arranged to conform in size and spacing to said pins so that said plate may be placed upon said platform with said pins projecting through said openings.

4. The combination with the supporting platform of a slicing machine, of a cover plate for said platform comprising a plate of relatively thin material having a smooth unobstructed upper surface for contacting with material supported by said platform, and means for removably holding said plate in position on said platform.

5. The combination with the work-supporting platform of a slicing machine having upwardly projecting pins thereon, of a cover plate for said platform comprising a sheet of corrosive-resisting material having openings therethrough arranged to conform in size and spacing with the pins on said platform so that said plate may be placed upon said platform with said pins projecting through said openings and may be easily removed from said platform for the purpose of cleaning.

6. The combination with the supporting platform of a slicing machine having a plurality of rows of sharpened pins projecting upwardly from the upper surface thereof, of a removable cover plate for said platform comprising a sheet of relatively thin corrosive-resisting material having a plurality of rows of openings therethrough arranged to conform in size and distribution with the pins on said platform so that said plate may be placed upon said platform with said pins projecting therethrough into position to engage material placed upon said cover plate and so that said cover plate may be readily removed for cleaning or other purposes.

In testimony whereof I have signed my name to this specification on this 9th day of September, A. D. 1919.

JOSEPH H. McLAUGHLIN.